Patented Nov. 7, 1922.

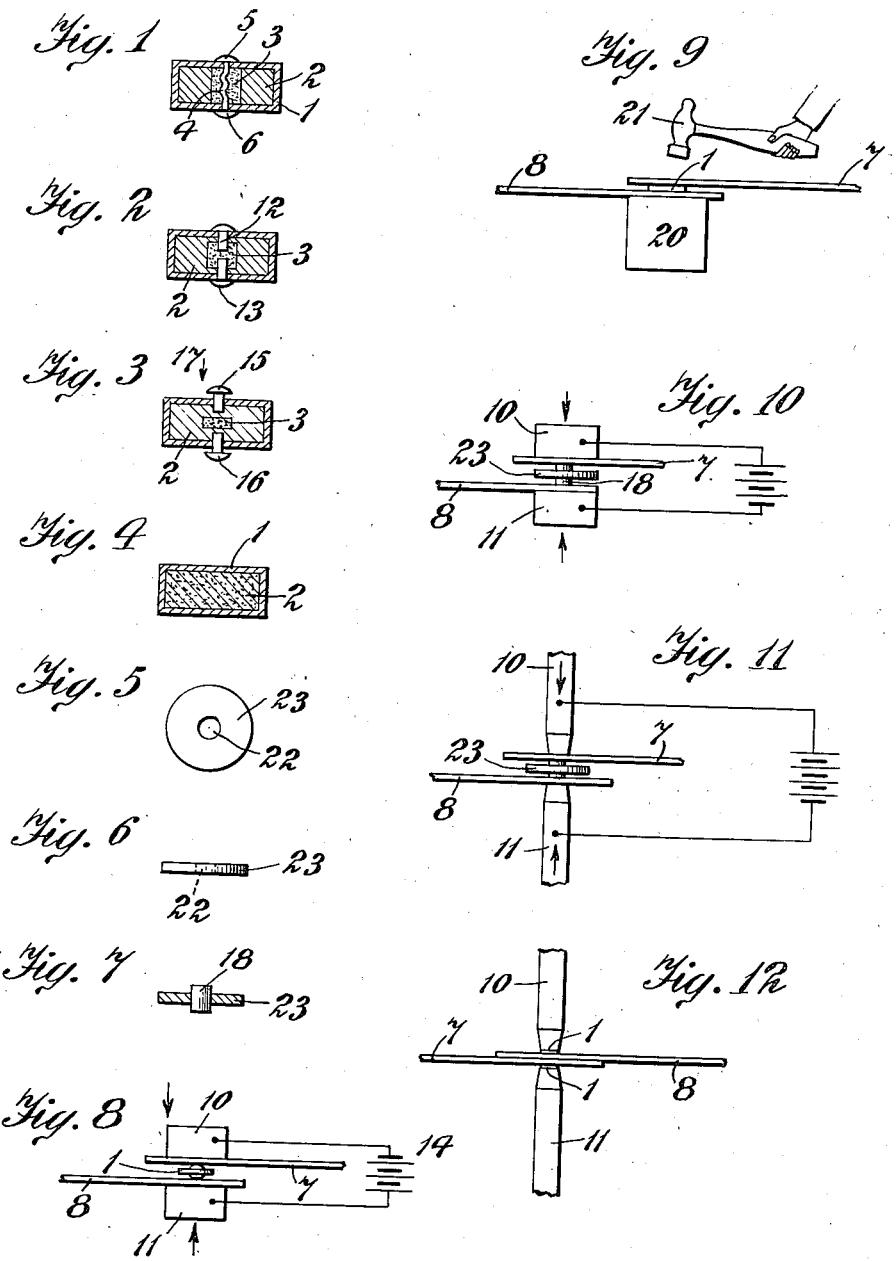

1,434,538

UNITED STATES PATENT OFFICE.

JAMES H. GRAVELL, OF ELKINS PARK, PENNSYLVANIA.

WELDING TABLET OR CAPSULE.

Original application filed October 20, 1917, Serial No. 197,544. Divided and this application filed April 22, 1920. Serial No. 375,844.

*To all whom it may concern:*

Be it known that I, JAMES H. GRAVELL, a citizen of the United States, and a resident of Elkins Park, in the county of Montgomery and State of Pennsylvania, have invented certain new and useful Improvements in Welding Tablets or Capsules, of which the following is a specification.

My present invention relates to tablets or capsules by means of which plates or sheets of metal may be welded together and is especially useful in forming isolated welds similar to what are known in the art as "spot welds." This application is a division of my prior application for patent for chemical welding filed October 20th 1917, Serial No. 197,544.

The object of the invention is to provide a quick, cheap and ready means of bringing metallic bodies such for instance as plates or sheets to a temperature suitable for welding and welding them together without the use of elaborate, expensive apparatus.

The capsule or tablet comprises a chemical substance capable when ignited of generating sufficient heat to bring the surface or surfaces of metal in contact with the substance immediately to a welding temperature and of producing a metallic substance adapted to unite with the metal at which time pressure is applied to the heated metal to produce the weld. When the capsule or tablet is placed between sheets of metal and ignited the opposing surfaces in contact with the substance are instantly brought to a welding temperature and when forced together extrude the welding substance or material of the capsule and contact with each other and, being at a high temperature, weld together. If desired, especially in the case of thin metal, the capsule or tablet may be placed on the outer surface.

Although many substances have a property of generating a high heat instantly, I prefer to use for this purpose in the capsule or tablet the substance known as "thermit," which consists of a mixture of black iron oxide and powdered aluminum. When this substance is ignited a very high temperature is produced and the substance changes into molten metal and aluminum oxide at a very high temperature.

The invention consists in the welding tablet or capsule hereinafter more particular described and then specified in the claims.

In the accompanying drawings I illustrate more or less diagrammatically various forms of capsules or tablets and also some ways of applying them to the work to be welded.

Figs. 1, 2, 3 and 4 illustrate cross-sections, on a greatly enlarged scale, through different forms of capsules or cartridges made in accordance with this invention.

Figs. 5, 6 and 7 illustrate a form of tablet according to this invention.

Figs. 8 to 12 inclusive illustrate various manners of applying the capsules or cartridges to the work.

The invention may be practiced in a number of ways to unite pieces of metal together at spots. In one manner I charge a capsule or cartridge with the welding material and provide means of igniting it. In another I provide a tablet made by compressing the heat generating material with a binder and associate igniting means of any suitable character with it as hereinafter described.

In Figs. 1, 2, 3 and 4 the heat generating material 2 is sealed in a capsule or cartridge 1 of any suitable material of sufficient thickness and strength to hold the material and which preferably will volatilize when the material is ignited. In the form shown in Fig. 1 a lighting powder 3 such as is ordinarily employed in the art for igniting thermit is placed in the body of the mass of heat generating material or welding substance 2 and through the lighting powder a fine wire 4 passes. The wire 4 is provided with terminals 5 and 6 on the outside of the capsule.

The capsule is inserted between two sheets of metal, 7, 8 as indicated in Fig. 8 and in line therewith two electrodes or blocks 10 and 11 are placed on the outside of the sheets. These electrodes are in the circuit of a battery or other source of current 14. Current from the battery passing through the fine wire 4 ignites the lighting powder which in turn ignites the welding substance causing the same to burn and by the chemical action set up therein to generate an exceedingly high temperature and a mass of molten high temperature metal. The metal of the sheets 7 and 8 in contact with the ignited substance immediately rises to a welding temperature and pressure is applied to the blocks 10 and 11 in any suitable manner. When the pressure is applied the material of the capsule or a large part of it is extruded from between the sheets.

In the form of capsule shown in Fig. 2 the fine wire 4 is replaced by two terminals 12 and 13 across which a high tension spark is passed to ignite the powder 3. This capsule may be used in the same manner as shown in Fig. 8 except an induction coil is added in the circuit to produce the required spark between the terminals 12 and 13.

In Fig. 3 two rods 15 and 16 center the capsule and explode or ignite the ignition powder or fulminate 3 by a sudden blow on the rods in the direction of the arrow 17. As indicated in Fig. 4 the ignition powder may be mixed directly with the welding substance 2 in which case a sudden blow against the capsule ignites the mass of welding substance. One manner of using the forms of capsules shown in Figs. 3 and 4 is diagrammatically indicated in Fig. 9, the pieces to be joined merely resting on a support or anvil 20 and the capsule 1 ignited by a blow of the hammer 21 on the outside of the sheet 7. A subsequent blow or blows of the hammer may be used to apply the necessary pressure to complete the weld.

If desired the use of a containing capsule or cartridge may be dispensed with. To do this I mix the welding substance with a binder such as sodium silicate and mold the mixture into any desired size tablet 23 as shown in Figs. 5 and 6. Preferably I provide these tablets with a central hole 22 in which is located a metal plug 18 of slightly greater length than the thickness of the tablet so as to project beyond preferably both surfaces of the tablet as shown in Fig. 7. This tablet is placed between the sheets to be joined as indicated in Fig. 10, the process then being the same as described in connection with Fig. 8, the metal plug 18 serving to conduct the current from one electrode to the other and in so doing becomes white hot, igniting the welding substance.

I also may make the tablet of such material that it will ignite when given a blow in which case the metal plug 18 is dispensed with and the process of uniting the metal with this tablet being similar to that described in connection with Fig. 9.

Again, if desired, I may mix the welding substance with metal filings or turnings so that the tablet will conduct current and in so doing raise the tablet to igniting temperature. The use of this form of tablet is shown in Fig. 11, the steps being the same as described in connection with Fig. 8.

If desired and especially when the sheets of metal are thin I may place the capsules or tablets on the outside of one or both of the sheets to be joined as indicated in Fig. 12.

It will be understood that in the drawings, for purposes of clearness of illustration, the size of the capsules and parts are shown exaggerated and not in correct proportion.

As will be evident from the foregoing description the tablets or capsules may be used where it is not convenient to obtain the electric current necessary to electrically weld as now practiced and as the chemicals are inexpensive the tablets or capsules are very cheap, the only apparatus required to complete the welding operation in some cases being an anvil and a hammer as indicated in Fig. 9. Also the facility with which the pieces can be joined in accordance with some of the forms of my invention will be evident; the capsules or tablets can be supplied and used in practically the same manner as tacks or nails.

The invention claim is:—

1. A device for uniting two plates or sheets of metal together in an isolated weld, comprising a tablet consisting of an ignitable substance and adapted for insertion between said plates and capable, on ignition, of bringing them to welding temperature, said tablet also embodying means for igniting the same when in place between the plates at the point of weld.

2. A device for uniting two plates or sheets of metal together in an isolated weld, comprising a tablet consisting of an ignitable substance and adapted for insertion between said plates and capable, on ignition, of bringing them to welding temperature, said tablet also containing means for igniting the substance by passing an electric current through it and through the two pieces to be welded when the tablet is in position at the welding point.

3. A device for uniting two plates or sheets of metal together in an isolated weld, comprising a tablet consisting of an ignitable substance and adapted for insertion between said plates and capable, on ignition, of bringing them to welding temperature, said tablet also being adapted to ignite by percussion applied to the tablet when in position at the point of weld.

Signed at New York, in the county of New York and State of New York this 21st day of April A. D. 1920.

JAMES H. GRAVELL.

Witness:
IRENE LEFKOWITZ.